United States Patent
Lamping

[15] 3,675,678
[45] July 11, 1972

[54] HIGH PRESSURE REGULATOR

[72] Inventor: Robert F. Lamping, St Louis County, Mo.

[73] Assignee: Modern Engineering Company, Inc., St. Louis, Mo.

[22] Filed: Dec. 8, 1969

[21] Appl. No.: 883,005

[52] U.S. Cl.....................137/505.22, 137/505.43, 137/509, 251/282, 251/333
[51] Int. Cl......................................................F16k 31/365
[58] Field of Search..........137/494, 505.18, 505.22, 505.23, 137/505.42, 505.43, 509, 505.3, 505.21, 625.66, 625.68, 505.15; 251/333, 282, 141, DIG. 1, 325

[56] References Cited

UNITED STATES PATENTS

| | | | |
|---|---|---|---|
| 768,246 | 8/1904 | Taylor | 137/505.22 |
| 1,923,595 | 8/1933 | Temple | 147/505.13 X |
| 3,107,693 | 10/1963 | Puster | 137/625.66 |
| 3,166,097 | 1/1965 | Hinderer | 251/DIG. 1 |
| 3,367,360 | 2/1968 | Hickerson | 137/505.22 X |
| 1,406,012 | 2/1922 | Hinchman | 137/505.22 |
| 2,202,313 | 5/1940 | Grove | 137/505.42 |
| 2,920,647 | 1/1960 | Mercier | 137/505.18 |

FOREIGN PATENTS OR APPLICATIONS

| | | | |
|---|---|---|---|
| 898,477 | 7/1944 | France | 137/505.22 |

*Primary Examiner*—Harold W. Weakley
*Attorney*—John H. Sutherland

[57] ABSTRACT

Gas pressure regulator for reducing relatively high storage pressure (e.g., 6,000 p.s.i.) to a conventional (e.g., 2,500 p.s.i. or less) working pressure, in which the means controlling fluid flow between input and output includes a differential area valve, the larger area of which is exposed to the input pressure, and the lesser area of which is exposed to the input pressure, with an area of intermediate size exposed to the pressure of a relatively fixed volume of gas acting on the differential valve in major degree counter to the action of the output pressure on the larger area of the differential area valve. The pressure on said fixed volume is adjusted upward by manually admitting more gas from the input, and adjusting downward by manually releasing gas therefrom either to the output side or to the atmosphere. A coil spring adds to the force applied by the gas at the larger area of the differential valve, thereby tending to maintain closed the passage between input and output; and a valve controlling flow from input to output has input pressure applied to it in such manner as to add the force on said differential valve, tending to open the passage between input and output.

6 Claims, 11 Drawing Figures

PATENTED JUL 11 1972 3,675,678

INVENTOR:
ROBERT F. LAMPING
BY John H. Sutherland
ATTORNEY,

HIGH PRESSURE REGULATOR

This invention relates generally to pressure regulators, and particularly to regulators of the character utilized in reducing the pressure of industrial and medicinal gases from the relatively high degree to which they are subjected during storage and transportation, to a substantially lower degree of pressure at which such gases are conventionally utilized.

Such fluid pressure regulators of the type in general use are typified by U.S. Pat. No. 2,672,891, and are characterized by complexity of mechanism, a multiplicity of parts, somewhat less than optimum stability of output pressure under declining input pressure, undesirably low input pressure limitations for use with modern high pressure tools.

The object of the invention, generally stated, is to provide such a pressure regulator of simplified construction, having a relatively small number of parts, and capable of providing nicety of adjustment and consistency of output pressure from an input pressure on the order of 6,000 pounds per square inch.

Other objects will become apparent to those skilled in the art from the following description.

Generally stated, the objects of the invention are achieved by providing such a pressure regulator with a differential area valve which controls the passage between the input and the output. The differential area valve has its major area exposed to the output pressure so that the force thereof tends to move the valve into a position at which flow from input to output is interrupted; its minor area exposed to input pressure tending to move the valve into a position permitting flow from input to output; together with another pair of major and minor areas (hereinafter termed the "subordinate major" and "subordinate minor" areas) which are, respectively, smaller than the first-mentioned major area and larger than the first-mentioned minor area, and which are concurrently exposed to the pressure of an isolated body of fluid exerting pressure in opposite directions on the differential valve, but having its major force component addressed counter to the force applied to the first-mentioned major surface by the output pressure. In addition, the valve controlling flow between output and input is preferably provided with a mechanical bias, such as that accomplished by a coil spring acting in a direction tending to keep closed the passage between the input and output.

The aforesaid isolated body of fluid is maintained under pressure adjusted to yield the desired pressure at the output from the available pressure at the input; and the adjustment is achieved manually, from time to time as required, by admitting additional fluid from the input to a chamber surrounding said subordinate major and subordinate minor areas, or by manually bleeding off fluid from said chamber into output or atmosphere, as desired. Preferably, two separate manually operated valves are provided, one for loading, and the other for bleeding the said chamber.

An illustrative embodiment of the invention is shown in the accompanying drawings, in which.

Figure 1:
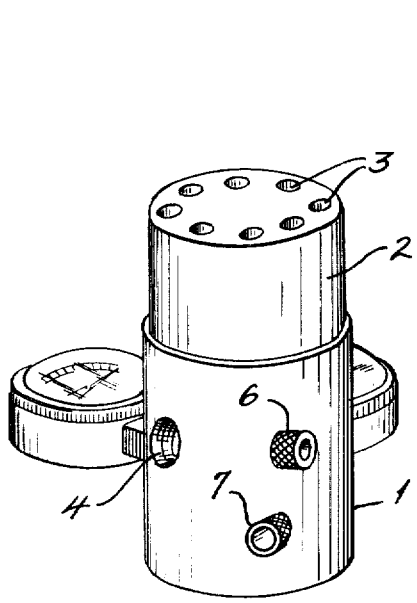
FIG. 1 is a perspective view of the regulator.
Figure 2:
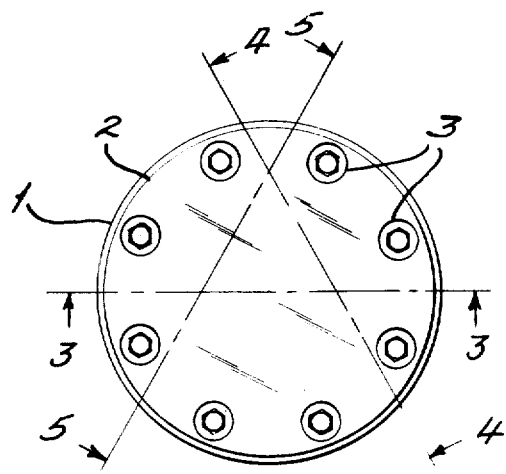
FIG. 2 is a top plan view of the regulator shown in FIG. 1.

As seen in FIG. 1, the regulator has a body 1 super-imposed by a bonnet 2, connected together in hermetic relationship by a plurality of screws 3 extending through the bonnet and threaded into tapped holes in the body. The body is provided with a input port 4, and diametrically opposite, but displaced downward therefrom, is an output port 5 (not seen in FIG. 1). At about 120° displacement from and at approximately the same level as input port 4, the externally manipulative portion of a loading valve 6 is seen in FIG. 1. Similarly, and at about 120° displacement from the remote end of the diameter on which output port 5 is located, but displaced axially downward therefrom, is the externally manipulative portion of a bleeding valve 7.

Figure 3:
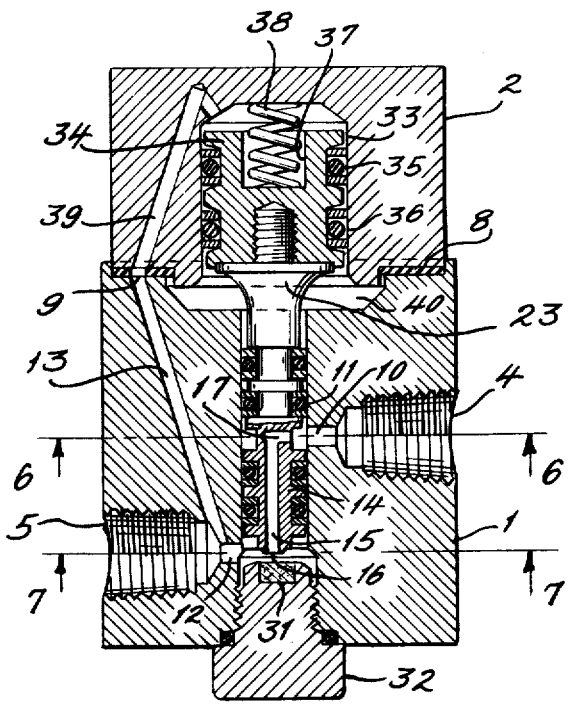
FIG. 3 is a sectional view taken along line 3—3 of FIG. 2.

Referring now to FIG. 3, it will be observed that a gasket 8 is interposed between the bonnet 2 and the body 1 to seal the bonnet and the body together, except in one place where the gasket 8 is provided with a hole 9 for a purpose to be later described.

The input port 4 is internally threaded to receive a pipe, or other conduit, leading from a cylinder, tank, or other supply of gas under high pressure, such as 6,000 pounds per square inch, and a duct 10 leads from the port 4 through the body 1 into a central barrel 11 extending axially of the body 1.

Similarly, port 5 is internally threaded to connect with a pipe, or other conduit, extending to the tool or apparatus to be energized by the lower pressure side of the regulator. From port 5, duct 12 leads to the lower end of barrel 11. A duct 13 also extends from port 5 through the body 1 to the upper face of the body where the hole 9 in gasket 8 is situated.

Barrel 11 accommodates a spooled stem portion 14 of a reciprocatory differential area valve assembly. The spooled stem 14 is provided with a central bore 15 having a mouth 16 at the lower end, and a mouth 17 at the upper end thereof. The mouth 17 is disposed to be in permanently open communication with duct 10 throughout the full range of reciprocatory movement within which stem 14 and its associated parts of the differential area valve may reciprocate in the axial direction, vertical as seen in FIG. 3.

Figure 8:
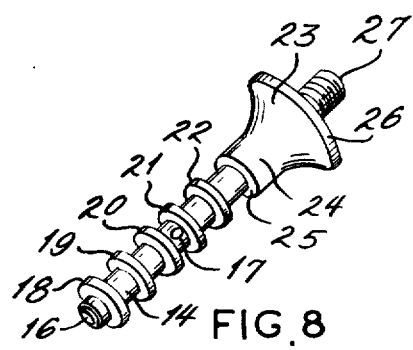
FIG. 8 is a perspective view of a spooled stem forming a part of the differential valve utilized in the regulator.

As previously indicated, the valve stem 14 is spooled, that is to say, it is provided with a series of spaced flanges 18, 19, 20, 21 and 22 (sometimes called "spooling"), which extend radially outward from the stem proper, as best shown in FIG. 8. The stem 14 is surmounted by a vase-shaped head 23, having a cylindrical portion 24 extending axially downward for a substantial distance, and terminating at its lower extremity in a shoulder 25. Above the cylindrical portion 24, the head 23 is flared outwardly, and terminates in a flange 26. A threaded stud 27 projects upwardly beyond the flange 26 for a purpose to be later described.

Figure 9:
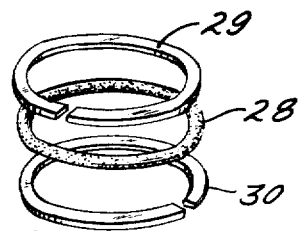
FIG. 9 is an exploded view in perspective of an anti-extrusion sealing ring set, a number of which are employed in the regulator.

The outside diameter of the several flanges 18–22 and the cylindrical portion 24 are such as to have a free-running fit within barrel 11. Between flanges 18–19, 19–20, and 21–22, as well as between flange 22 and shoulder 25, there is interposed an anti-extrusion set of rings shown in exploded relation-ship in FIG. 9. Each set of rings consists of a conventional O-ring 28 of rubber, or the like, above and below which is a wafer-type gapped ring 29 and 30 respectively. The gapped rings 29 and 30 are preferably made of Teflon, or other suitable self-lubricating, relatively stiff but resilient material which imparts to the ring a flexibility sufficient to enable it to be applied in the space between successive flanges or spooling of the stem 14, and thereafter to bear, with a substantial pressure, against the interior of barrel 11.

In the embodiment illustrated, it is not intended that any sealing rings be applied between spooling flanges 20 and 21 where mouth 17 is situated. Thus, the space between flanges 20 and 21 provides continuous communication between mouth 17 and duct 10 because the distance between flanges 20 and 21 is at least as great as the amplitude of reciprocatory movement permitted stem 14. Hence, regardless of whether the stem 14 is at the upper limit of its reciprocatory movement, or at the lower limit thereof, mouth 17 will be in position to receive fluid discharged into barrel 11 through duct 10, and to conduct that fluid through bore 15 to mouth 16, except, of course, that when the stem 14 is at the lower limit of its reciprocatory movement, mouth 16 is closed by engagement with a valve seat 31 mounted in a recess at the upper end of a cap 32 which is in threaded engagement with body 1 concentric with barrel 11. Thus, at the lower extremity of its reciprocatory movement, flow of fluid through bore 15 and mouth 16 is interrupted. The valve seat 31 is made of any conventional valve seat material, such as leather, rubber-like material, plastic, or soft metal, and one aspect of the invention is the ease of replacement of this, the only perishable element of the regulator.

Figure 4:
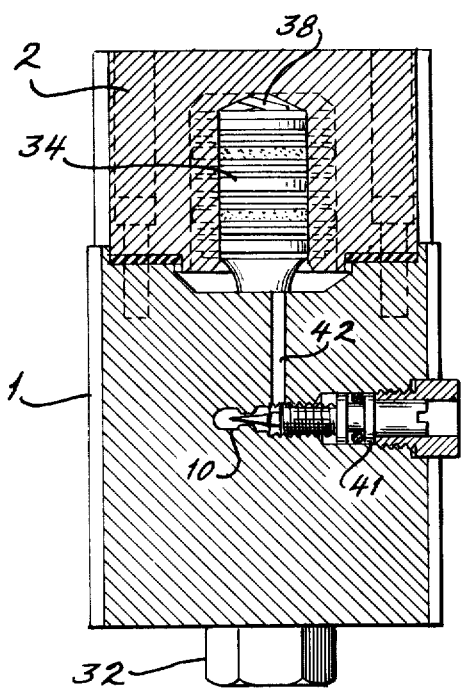
FIG. 4 is a sectional view taken along line 4—4 of FIG. 2.
Figure 5:
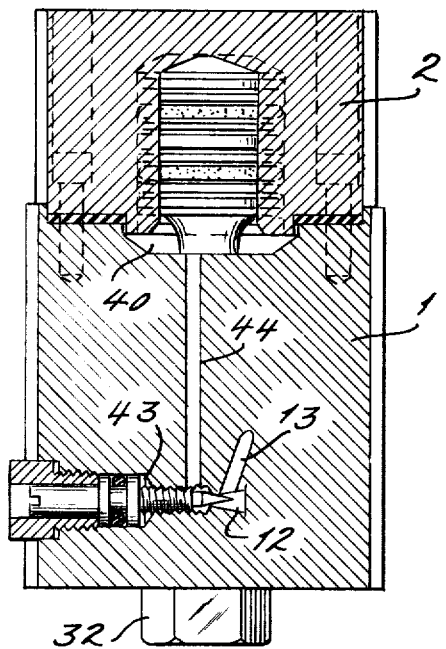
FIG. 5 is a sectional view taken along line 5—5 of FIG. 2.

The bonnet 2 is provided with a cylinder 33 so disposed in the bonnet that when the bonnet and body 1 are assembled together, as shown in FIGS. 3, 4 and 5, the cylinder 33 will be coaxial with barrel 11. The cylinder 33 accommodates a piston 34, which is threadedly connected with stud 27, previously described, so that the two operate as one. Piston 34 is equipped with two sets, 35 and 36, of multi-piece sealing rings of the character illustrated in FIG. 9, but of greater diameter than those employed on the stem 14. Piston 34 is also provided with a recess 37, in which a coil spring 38 is accommodated, with its upper end seated against the roof of cavity 33.

In the illustrated embodiment, the bonnet 2 is provided with a duct 39 extending from hole 9 in gasket 8 to the top of cavity 33 above piston 34, thereby completing a channel of fluid communication from output port 5 through duct 13, hole 9, and duct 39, to the space within cavity 33 above piston 34. This passageway remains open at all times, and is thus effective to continuously apply the pressure prevailing at the output port 5 to the space within cylinder 33 and above piston 34. The fluid pressure at output magnitude thus constantly adds to the force of spring 38, tending to force the piston and its adjunct parts downwardly, thereby constantly biasing mouth 16 into fluid flow-interrupting engagement with valve seat 31.

The upper surface of piston 34 constitutes the pressure-receiving surface of greatest area within the differential area valve assembly which consists of piston 34, head 23, stem 14, and the several sets of sealing rings on the stem and the piston. In that differential area valve assembly, the minimum area to which pressure is applied is the area within mouth 17 and bore 15, where the input pressure acts continuously in all directions, but the net effective area opposing the pressure applied through duct 39 to piston 34 is the area of mouth 16.

The invention contemplates that the differential area valve be provided with a third fluid pressure component by means of which the force exerted upon the differential valve assembly by the input pressure at mouth 17 is reinforced in a degree which is manually adjustable. To accomplish this, the body 1 is provided, at its upper end, with a cavity 40 shown as being of slightly greater perimeter than that of cylinder 33. As clearly shown in FIG. 3, the cavity 40 is so oriented with respect to cylinder 33 and piston 34 that fluid pressure acting within cavity 40 against the lower end of the piston 34, including the flare of head 23, exerts a force on the piston 34 which is counter to the force exerted by spring 38 plus that exerted by the output pressure applied through duct 39.

Figure 6:
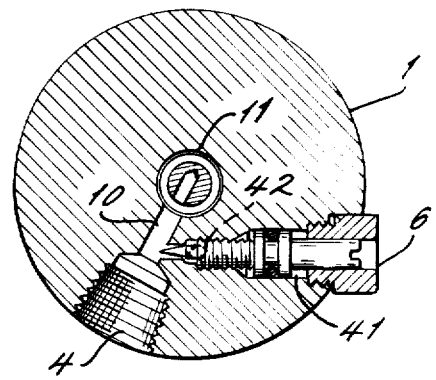
FIG. 6 is a sectional view taken along line 6—6 of FIG. 3.
Figure 7:
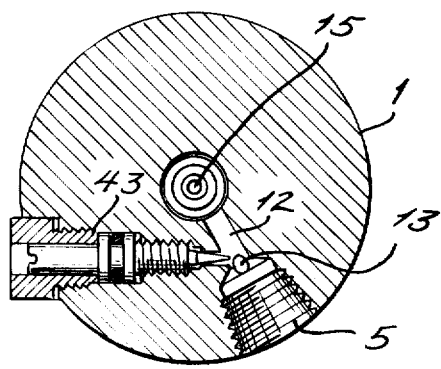
FIG. 7 is a sectional view taken along line 7—7 of FIG. 3.

Fluid, such as gas, is passed from input port 4 to chamber 40 through the instrumentalities illustrated in FIG. 4 and 6. A stepped hole 41 is drilled and counterbored in body 1 in a position such as to intersect with duct 10, and a hole 42 is drilled from cavity 40, axially of body 1, in a position such as to intersect with hole 41 near the smaller end thereof. A suitable manually manipulable valve is housed in hole 41, with its sealing parts disposed to open and close the communication between duct 10 and hole 42. In the form illustrated in FIG. 4, the valve for the last-mentioned purpose is a conventional needle valve, which may be manipulated between closed and open positions, and vice versa, by a screwdriver and locked in any position by a nut. The details of the valve utilized for the last-named purpose form no part of the present invention, it being understood that any other appropriate valve structure may be employed for this purpose, as fluid flow from duct 10 through hole 42 is never maintained for more than the second or so required to charge cavity 40 to approximately the desired pressure. Achieving the desired pressure within cavity 40 is a matter of cut and try on the occasions when the regulator requires readjustment. The valve in hole 41, when open, permits the flow of fluid from input port 4 toward cavity 40. To reduce the pressure within cavity 40, a bleeding valve is provided, as illustrated in FIGS. 5 and 7. In the form there shown, a hole 43 of stepped diameter is drilled from the exterior of body 1, so as to intersect with duct 12 at output pressure. Within the hole 43, a needle valve comparable to that described for hole 41 is provided. The function of the valve in hole 43 is solely to release fluid from chamber 40 in the course of adjusting or calibrating the regulator, and, as in the case with the loading valve previously described, the bleeding valve may be manipulated with a screwdriver, or other convenient means, and any appropriate locking device may be provided for keeping the valve in flow-interrupting position once the appropriate pressure in chamber 40 has been achieved. When the bleeding valve is open, fluid, such as gas, flows from chamber 40 through a duct 44 to the output port 5.

The pressure of the captive mass of gas confined within chamber 40 acts upwardly (as seen in FIG. 3) against piston 34, that is to say, counter to the force exerted by spring 38 plus the output pressure communicated through duct 39. The area on which fluid confined in chamber 40 acts on the piston is, however, less than the area on which the output pressure acts on the top of the piston 34. The difference is represented by the cross-sectional area of cylindrical portion 24 on head 23. While the shoulder 25 adds to the net area just mentioned to yield the previously mentioned "subordinate major area," the fluid pressure acting on shoulder 25 is neutralized by the fluid pressure acting in the opposite direction upon the previously mentioned "subordinate minor area," to wit, the ring set confined between shoulder 25 and flange 22, and imposing through that ring set a force tending to drive the differential area valve assembly downwardly in opposition to the force applied by the same confined body of fluid tending to drive piston 34 upwardly.

Having adjusted the pressure within chamber 40 to the desired value, those skilled in the art will recognize that the output pressure plus spring 38 tends to drive spool 14 toward the position at which flow through bore 15 and mouth 16 is stopped by valve seat 31; at the same time, the higher input pressure exerted within bore 15 and mouth 17 tends, in minor degree, to drive the stem 14 upwardly to separate mouth 16 from seat 31, and permit flow from output to input. The captive body of pressurized fluid within cavity 40, however, provides the major force tending to separate mouth 16 from seat 31 as it acts counter to spring 38, and thereby tends to move the stem 14 into position opening the valve 16–31. Hence, in any case, to reduce the flow from input port 4 to output port 5, the sum of the output pressure times the area of the top of piston 34, plus the force of the spring 38, must be greater than the input pressure times the area of mouth 16, plus the pressure within chamber 40, times the net area of piston 34 minus shoulder 25; and fluid flow from input port 4 past valve 16–31 to output port 5 is automatically increased when the pressure at the output port 5 (which is the fluid pressure above piston 34) declines. Once the pressure within chamber 40 has been properly adjusted, the regulator maintains output at such degree of constancy that, in the practical sense, changes in ambient temperature cause a greater variation than does decline of input pressure. For example, the regulator of FIGS. 1–9 having:

cylinder 33, 1 inch in diameter;
barrel 11, 76ths inch diameter;
mouth 16, five 64s inch diameter;
spring 38, exerting a force of 30 pounds;

can have the captive gas within chamber 40 so adjusted that an input pressure of 6,000 p.s.i. is automatically reduced to 2,500 p.s.i. output pressure; but decline of input pressure results in but miniscule decline of output pressure, e.g., ambient conditions remaining constant, when the input pressure declines to 3,000 p.s.i., the output pressure declines only to 2,480 p.s.i.

Figure 10:
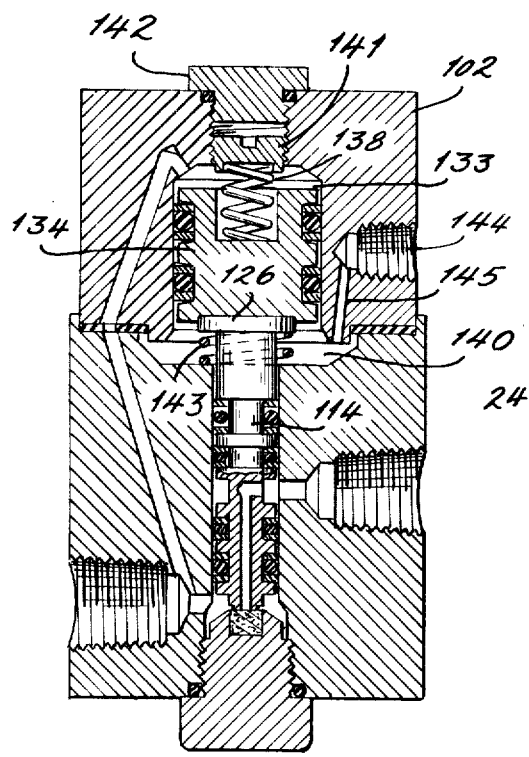
FIG. 10 is a view corresponding generally with FIG. 3, but showing a modified form of the regulator.

A modified form of the regulator is shown in FIG. 10, which is a sectional view corresponding generally with FIG. 3, with the differences now to be described. In the embodiment of FIG. 10, the bonnet 102 is equipped with means for adjusting the force exerted by spring 138 upon piston 134. Such adjusting means comprises providing the bonnet with a threaded hole extending from the top thereof to the cylinder 133. In that hole, there is provided a screw-threaded member 141, against the lower face of which spring 138 bears. Downward movement of screw 141 increases the force applied to piston 134 by spring 138 and conversely upward movement of the screw relaxes the spring. Above screw 141, a cap 142 is provided to seal the threaded hole occupied by screw 141 against the egress of fluid from cylinder 133. In this embodiment, the spooled stem 114 is not, as in the previous embodiment, mechanically connected to operate as a unit with piston 134. On the contrary, the piston 134 in the FIG. 10 embodiment is free for axial movement relative to stem 114 and each is movable independently of the other; but the stem is constantly biased toward piston 134 by the interposition of a spring 143 between the floor of cavity 140 and flange 126, which is mechanically connected to, and can be integral with, spooled stem 114. The spring 143 exerts its force to urge stem 114 toward the open position of valve 16–31 in a degree which substantially compensates for the friction of the several anti-extrusion sealing ring sets (FIG. 9) on the stem 114 and piston 134, thereby making the regulator somewhat more sensitive to small variations in either the input pressure or the output pressure.

In the FIG. 10 embodiment, unlike the previous embodiment, the arrangement is adapted to permit control of the fluid pressure within cavity 140 from a remote position, and to this end, the bonnet is provided with a port 144 connected to cavity 140 by a hole 145. Port 144 is intended to be connected through suitable tubing to a remotely located valve for charging or bleeding, as the circumstances may require, fluid under pressure into and out of cavity 140.

Figure 11:
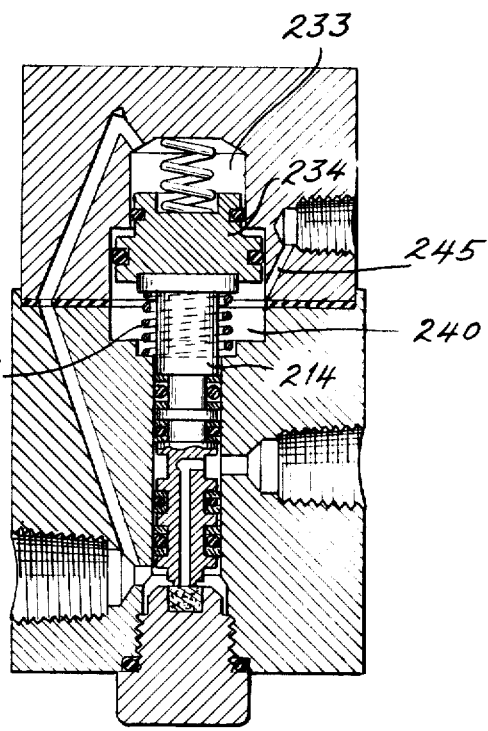
FIG. 11 is a view corresponding generally with the lower half of FIG. 3, but showing a further modified form.

A still further embodiment of the invention is shown in FIG. 11, in which the piston 234 is provided with an upper face of substantially smaller area than the lower face thereof. The cylinder 233 is comparably shaped. The larger lower face of piston 234 is, as in the previous embodiments, exposed to a captive body of fluid under pressure confined within a cavity 240, and provision is made, via duct 245 in the bonnet, to introduce pressurized fluid into, and bleed the same from, cavity 240 either remotely controlled, as in the case of the FIG. 10 embodiment, or, if desired, locally controlled, as in the case with the embodiment first described. In the FIG. 11 embodiment, like the FIG. 10 embodiment, the piston 234 is mechanically separate from the spooled stem 214, but a spring 243 biases the stem toward and into engagement with the larger lower face of piston 234 and toward a position at which the valve 16-31 is open. However, unlike the FIG. 10 embodiment, the greater area of the differential valve is exposed to the pressure applied by the captive fluid within cavity 240, thereby multiplying the force exerted by the captive fluid in a direction tending to open the valve 16-31 more than the force exerted by the fluid under output pressure above the piston is multiplied.

Those skilled in the art will readily understand that whether the captive fluid chamber is charged and/or bleeded at the regulator, or remotely therefrom, is a matter of convenience dictated by the conditions and environment of use, and it will be understood that where the circumstances dictate, the structure of the FIG. 3 embodiment can be adapted for remote control in the manner suggested by the embodiments of FIGS. 10 and 11. On the other hand, the contrasting differential valve arrangements of the respective embodiments lead to quite different specific results which dictate their utilization under different environmental and operating conditions. For example, use of the embodiment of FIG. 3 is indicated when the regulator is intended to control flow from a high pressure source to a relatively large (e.g., 1,000 cubic feet) receiver which is empty, or substantially empty, at start, and it is desired to fill the receiver quickly; or in other situations when abnormality occurring on the output side will tend to keep the valve 16-31 open. On the other hand, where the regulator is to be used to control the pressure at which fluid systems are tested, such as in the testing of refinery coils (conventionally at 900 p.s.i.), if the system under test, or the conduit leading to it, should burst, the embodiment of FIG. 10 will automatically shut off the flow of fluid through the regulator when the rate of flow exceeds the value for which the regulator is adjusted, and such flow will remain shut off until the cavity which confines the captive fluid in the regulator is drained. The embodiment of FIG. 11, while operating in principle the same as that of FIG. 10, may be utilized with the spooled valve stem movable independently of, or integral with, the piston which is sensitive to output pressure, and whether the pressure on the captive body of fluid is controlled locally or remotely, the arrangement of FIG. 11 is desirable in "fluidic" systems which utilize a relatively low pressure to control a much higher pressure. Thus, while there is a certain community of structure, function and mode of operation shared by the three embodiments of the invention herein disclosed, each embodiment is possessed of features which render it more desirable than either of the others under certain conditions of operation and environment.

From the foregoing description, those skilled in the art should readily understand the invention and appreciate its advantages. While three different embodiments have been disclosed in detail, it should be understood that the invention is not limited to those embodiments.

Having thus described the invention, what is claimed and desired to be secured by Letters Patent is:

1. A fluid pressure regulator, comprising, a body, a bonnet mounted on said body, said body having an input and an output port, said bonnet having a cylinder in open fluid flow communication with said output port, said body having a cylinder in open fluid flow communication with said input port, axially movable differential area piston means having a major surface in said bonnet cylinder, and a minor surface in said body cylinder, a duct extending axially of said piston means from a mouth adjacent said input port to a mouth adjacent said output port, a removable plug in said body in axial alignment with said piston, and a valve seat removably mounted in said plug in position for engagement with the mouth of said duct adjacent said output port when the predominant forces on said differential piston tend to urge the piston toward said valve seat.

2. The regulator of claim 1 in which the differential area piston has its major and minor surfaces free for limited axial movement independently of each other.

3. The regulator of claim 2 having a spring constantly biasing said differential area piston means away from said valve seat.

4. The regulator of claim 1 in which the cylinder in the bonnet has a zone of minor diameter and an axially displaced zone of major diameter, a piston having a face of minor diameter in said first-mentioned cylinder zone and a face of major diameter in said last-mentioned cylinder zone, said open fluid flow communication from the output port terminating in said first-mentioned cylinder zone, a captive body of fluid confined in said last-mentioned cylinder zone, and means confining a captive body of fluid in force-transmitting relationship with said piston face of major diameter.

5. A fluid pressure regulator having an inlet port and an outlet port, and means for controlling the flow of fluid between said ports, comprising, a reciprocatable member having a duct extending axially thereof from a first mouth adjacent the input port to a second mouth adjacent the output port, said first mouth being proportioned to remain in open communication with the port adjacent it regardless of the position of said member in its reciprocatory stroke, the other of said mouths being constructed and arranged to be closed at one extreme of the reciprocatory stroke of said member, a surface formed at the end of said reciprocatable member and disposed opposite the mouth adjacent the output port and said surface exposed to the fluid under the pressure at the output port, said surface having an area normal to the direction of reciprocation so disposed that the pressure of said fluid tends to drive said member toward the position at which said second mouth is closed, the interior surface of said duct being of less area than said first surface and exposed to the fluid under pressure at the input port, said duct surface having an area normal to the direction of reciprocation so disposed that the pressure of said fluid tends to drive said member away from the position at which said second mouth is closed, a pressure balance cavity embracing part of said reciprocatory member, means for charging said cavity with fluid and for varying the pressure on the fluid therein, the confines of said cavity including a surface normal to the direction of reciprocation of said member, a valve controlling the flow of fluid from said input port into said cavity to increase the pressure in said cavity, and a second valve controlling a flow of fluid from said cavity into said output port to decrease the pressure in said cavity.

6. The regulator of claim 5 wherein said reciprocatory member is mechanically separable within said cavity and comprising a piston and a stem, said cavity surfaces being formed in part by one side of said piston, and being formed in part by its stem.

* * * * *